(12) United States Patent
Davidson et al.

(10) Patent No.: US 12,006,150 B2
(45) Date of Patent: Jun. 11, 2024

(54) APPARATUS AND METHOD FOR CHARGING A ROBOTIC LOAD HANDLING DEVICE

(71) Applicant: Ocado Innovation Limited, Hatfield (GB)

(72) Inventors: Alex Davidson, Hatfield Herts (GB); Robin Sim, Hatfield Herts (GB); James Benfold, Hatfield Herts (GB); Benjamin Thurnell, Hatfield Herts (GB)

(73) Assignee: OCADO INNOVATION LIMITED, Herts (GB)

( * ) Notice: Subject to any disclaimer, the term of this patent is extended or adjusted under 35 U.S.C. 154(b) by 768 days.

(21) Appl. No.: 17/053,937

(22) PCT Filed: May 8, 2019

(86) PCT No.: PCT/EP2019/061808
§ 371 (c)(1),
(2) Date: Nov. 9, 2020

(87) PCT Pub. No.: WO2019/215221
PCT Pub. Date: Nov. 14, 2019

(65) Prior Publication Data
US 2021/0221611 A1    Jul. 22, 2021

(30) Foreign Application Priority Data
May 9, 2018   (GB) ...................................... 1807562

(51) Int. Cl.
*B65G 1/06* (2006.01)
*B60L 53/16* (2019.01)
(Continued)

(52) U.S. Cl.
CPC .............. *B65G 1/065* (2013.01); *B60L 53/16* (2019.02); *B65G 1/0464* (2013.01);
(Continued)

(58) Field of Classification Search
CPC .................. B65G 1/065; B65G 1/0464; B65G 2201/0235; B65G 1/1373; B60L 53/16;
(Continued)

(56) References Cited

U.S. PATENT DOCUMENTS 9,821,959 B2   11/2017   Hognaland
10,086,999 B2  10/2018   Stadie et al.
(Continued)

FOREIGN PATENT DOCUMENTS

CN    104781163 A       7/2015
CN    105899398 A  *    8/2015    .......... B60L 11/1809
(Continued)

OTHER PUBLICATIONS

Office Action dated Nov. 16, 2021, by the Canadian Patent Office in corresponding Canadian Patent Application No. 3,095,700. (6 pages).
(Continued)

*Primary Examiner* — Thomas Randazzo
(74) *Attorney, Agent, or Firm* — BUCHANAN INGERSOLL & ROONEY PC (57) ABSTRACT

The present disclosure aims to provide a charge unit for a robotic load handling device which reduces the wear/damage experienced by charge contacts of the charge unit and provides a solution whereby easier servicing of the charge unit can be accomplished. A charge unit for a robotic load handling device is operative on top of a grid framework. The charge unit includes a plurality of profiled sections arranged to interface with a hoist element of the robotic load handling device, and a power transfer device is arranged to transfer power to the robotic load handling device.

13 Claims, 13 Drawing Sheets

(51) Int. Cl.
  *B65G 1/04* (2006.01)
  *H02J 7/00* (2006.01)
  *H02J 13/00* (2006.01)

(52) U.S. Cl.
  CPC ...... *H02J 7/00036* (2020.01); *H02J 13/0005* (2020.01); *B65G 2201/0235* (2013.01)

(58) Field of Classification Search
  CPC ...... B60L 2200/44; B60L 53/31; B60L 53/35; B60L 2200/40; H02J 7/00036; H02J 13/0005; Y02T 10/70; Y02T 10/7072; Y02T 90/12; Y02T 90/16; Y02T 90/14; B25J 19/005; Y02P 90/60
  See application file for complete search history.

(56) References Cited

U.S. PATENT DOCUMENTS

| | | |
|---|---|---|
| 10,189,641 B2 | 1/2019 | Hognaland |
| 10,474,141 B2 | 11/2019 | Stadie et al. |
| 10,901,404 B2 | 1/2021 | Stadie et al. |
| 10,955,834 B2 | 3/2021 | Stadie et al. |
| 11,066,239 B2 | 7/2021 | Stadie et al. |
| 11,072,494 B2 | 7/2021 | Hognaland |
| 11,079,770 B2 | 8/2021 | Stadie et al. |
| 2015/0127143 A1 | 5/2015 | Lindbo et al. |
| 2016/0272421 A1 | 9/2016 | Hognaland et al. |
| 2016/0311336 A1 | 10/2016 | Morris et al. |
| 2016/0325932 A1 | 11/2016 | Hognaland |
| 2018/0065804 A1 | 3/2018 | Hognaland |
| 2018/0075402 A1 | 3/2018 | Stadie et al. |
| 2018/0276606 A1 | 9/2018 | Stadie et al. |
| 2018/0276607 A1 | 9/2018 | Stadie et al. |
| 2018/0276608 A1 | 9/2018 | Stadie et al. |
| 2019/0054932 A1* | 2/2019 | Stadie .................. B61B 5/02 |
| 2019/0263589 A1* | 8/2019 | Clarke .................. G06N 5/02 |
| 2020/0012268 A1 | 1/2020 | Stadie et al. |
| 2021/0149382 A1 | 5/2021 | Stadie et al. |
| 2022/0155797 A1 | 5/2022 | Stadie et al. |

FOREIGN PATENT DOCUMENTS

| | | |
|---|---|---|
| CN | 105899398 A | 8/2016 |
| CN | 106662874 A | 5/2017 |
| KR | 20170013973 A | 2/2017 |
| WO | 2010128263 A1 | 11/2010 |
| WO | 2015019055 A1 | 2/2015 |
| WO | 2015104263 A2 | 7/2015 |
| WO | 2015140216 A1 | 9/2015 |
| WO | 2015185628 A2 | 12/2015 |
| WO | 2017148939 A1 | 9/2017 |
| WO | 2017153583 A1 | 9/2017 |
| WO | 2017173423 A1 | 10/2017 |
| WO | 2017186825 A1 | 11/2017 |

OTHER PUBLICATIONS

Office Action (Examination Report No. 1) dated Oct. 6, 2021, by the Australian Patent Office in corresponding Australian Patent Application No. 2019267067. (6 pages).

Office Action (Request for the Submission of an Opinion) dated Jun. 28, 2022, by the Korean Patent Office in corresponding Korean Patent Application No. 10-2020-7031156, and an English Translation of the Office Action. (10 pages).

Office Action (Examination Report No. 2) dated Jul. 13, 2022, by the Australian Patent Office in corresponding Australian Patent Application No. 2019267067. (9 pages).

Final Office Action dated May 17, 2022, by the Japanese Patent Office in corresponding Japanese Patent Application No. 2020-563422, and an English Translation of the Office Action. (5 pages).

First Office Action dated Dec. 2, 2022, by the Chinese Patent Office in corresponding Chinese Patent Application No. 201980027579.1, and an English Translation of the Office Action. (10 pages).

First Office Action dated Jan. 11, 2022, by the Japanese Patent Office in corresponding Japanese Patent Application No. 2020-563422, and an English Translation of the Office Action. (9 pages).

International Search Report (with English Translation) and Written Opinion issued in corresponding International Patent Application No. PCT/EP2019/061808, 13 pages (dated Sep. 18, 2019).

Office Action (Examination Report No. 1) issued on Feb. 19, 2024, by the Australian Patent Office in corresponding Australian Patent Application No. 2022235543. (4 pages).

\* cited by examiner

APPARATUS AND METHOD FOR CHARGING A ROBOTIC LOAD HANDLING DEVICE

TECHNICAL FIELD

The present invention relates generally to the field of robotic load handling devices and more specifically to an apparatus and method for charging a robotic load handling device.

BACKGROUND

PCT Publication No. WO2015/185628A (Ocado) describes a known storage and fulfilment system in which stacks of bins or containers are arranged within a grid framework structure. The bins or containers are accessed by load handling devices operative on tracks located on the top of the grid framework structure. A system of this type is illustrated schematically in FIGS. 1 to 3 of the accompanying drawings.

Figure 1:
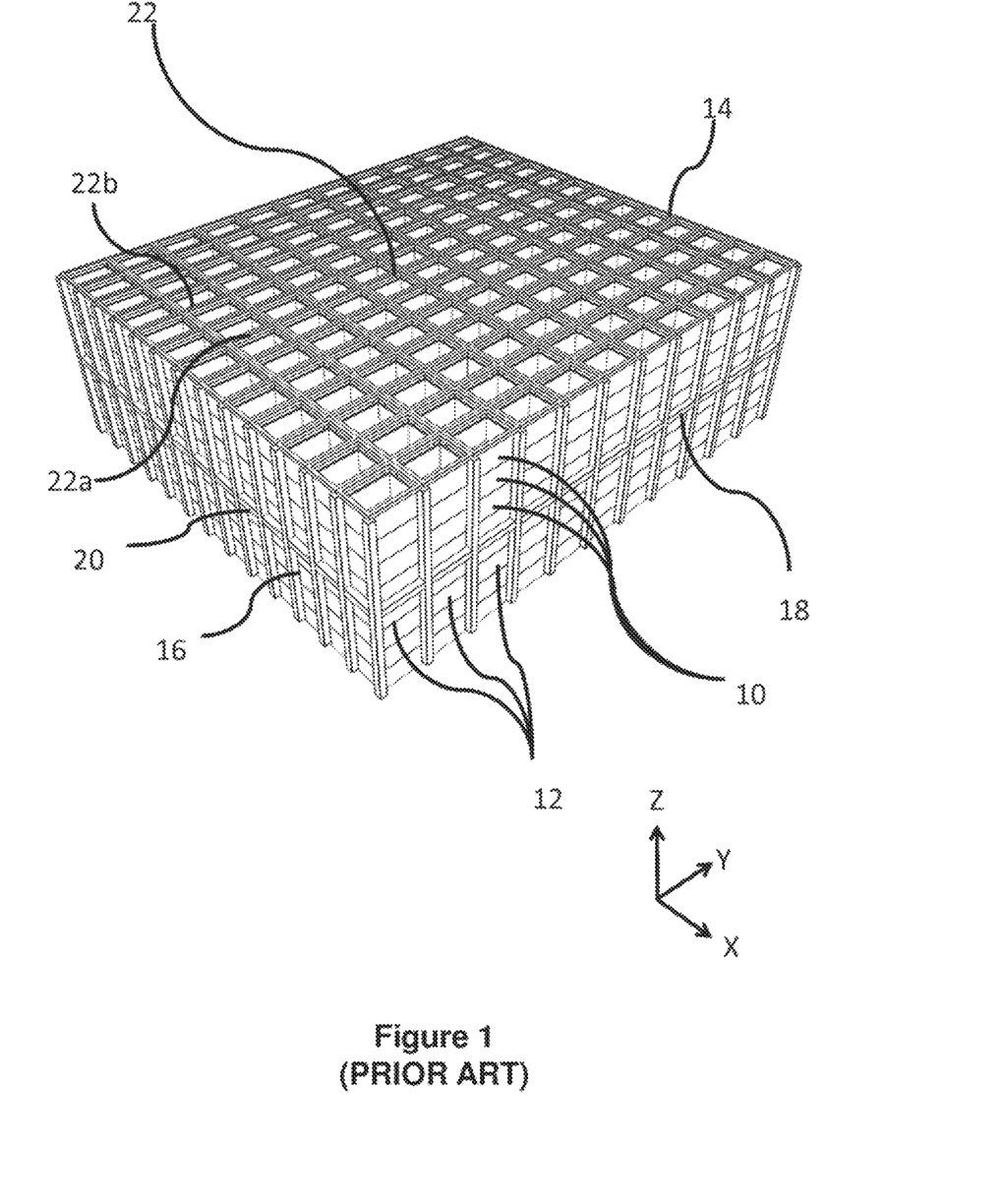
FIG. 1 is a schematic diagram of a grid framework structure according to a known system.
Figure 2:
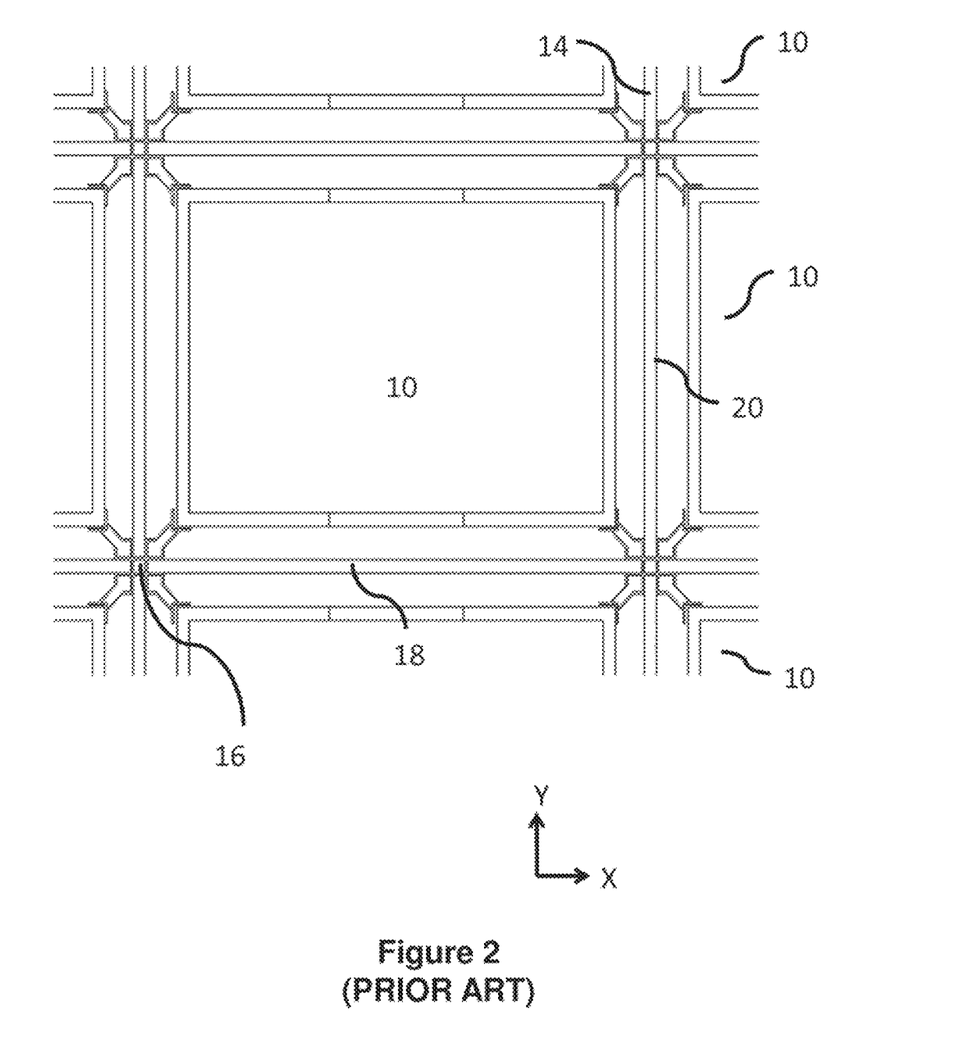
FIG. 2 is a schematic diagram of a top-down view showing a stack of bins arranged within the framework structure of FIG. 1.

As shown in FIGS. 1 and 2, stackable containers, known as bins 10, are stacked on top of one another to form stacks 12. The stacks 12 are arranged in a grid framework structure 14 in a warehousing or manufacturing environment. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

The grid framework structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the grid framework structure 14, so that the grid framework structure 14 guards against horizontal movement of the stacks 12 of bins 10, and guides vertical movement of the bins 10.

Figure 3:
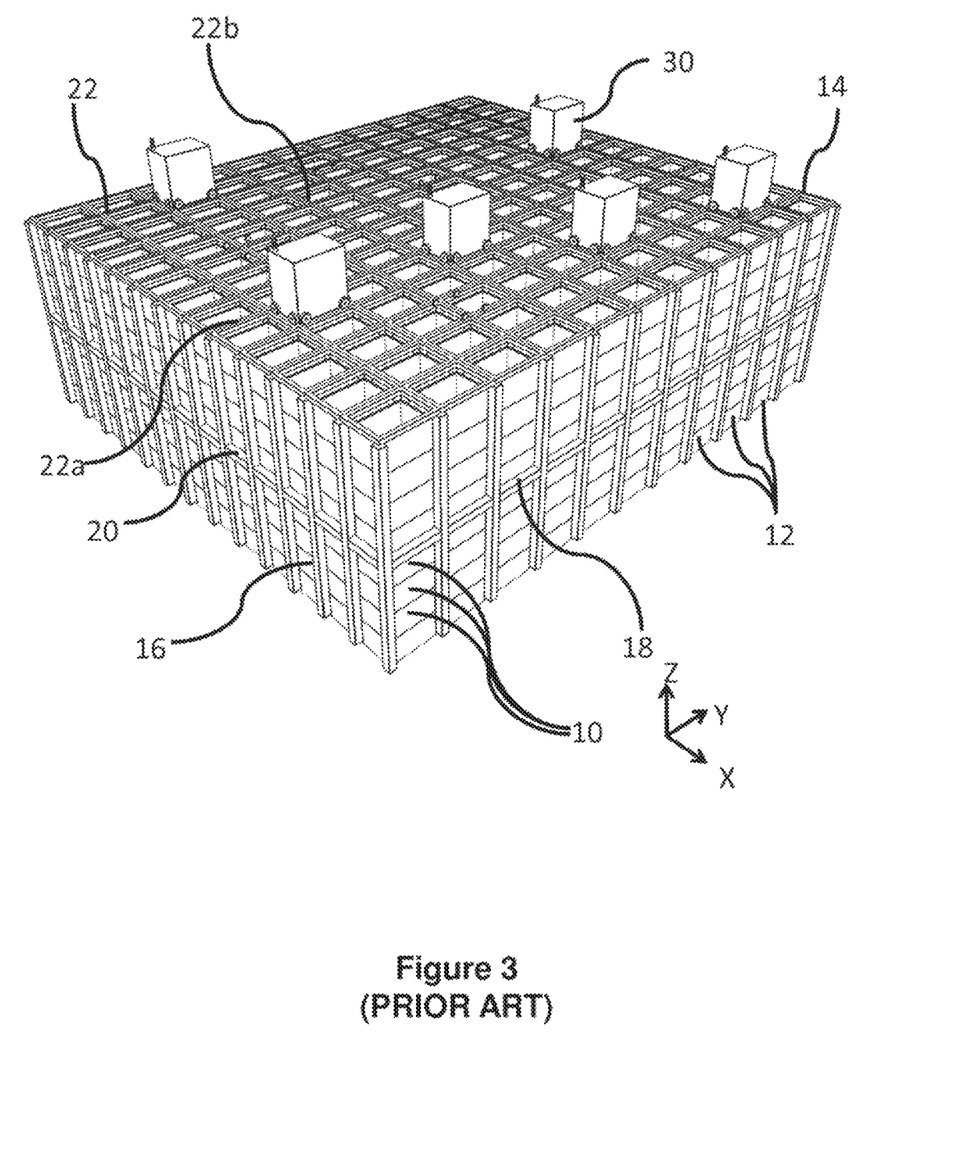
FIG. 3 is a schematic diagram of a system showing known robotic load handling devices operating on the grid framework structure.

The top level of the grid framework structure 14 includes rails 22 arranged in a grid pattern across the top of the stacks 12. Referring additionally to FIG. 3, the rails 22 support a plurality of robotic load handling devices 30. A first set 22a of parallel rails 22 guide movement of the robotic load handling devices 30 in a first direction (for example, an X-direction) across the top of the grid framework structure 14, and a second set 22b of parallel rails 22, arranged perpendicular to the first set 22a, guide movement of the robotic load handling devices 30 in a second direction (for example, a Y-direction), perpendicular to the first direction. In this way, the rails 22 allow movement of the robotic load handling devices 30 laterally in two dimensions in the horizontal X-Y plane, so that a robotic load handling device 30 can be moved into position above any of the stacks 12.

A known robotic load handling device 30 is described in PCT Patent Publication No. WO2015/019055 (Ocado), hereby incorporated by reference, where each robotic load handling device 30 only covers one grid space of the grid framework structure 14.

Figure 4:
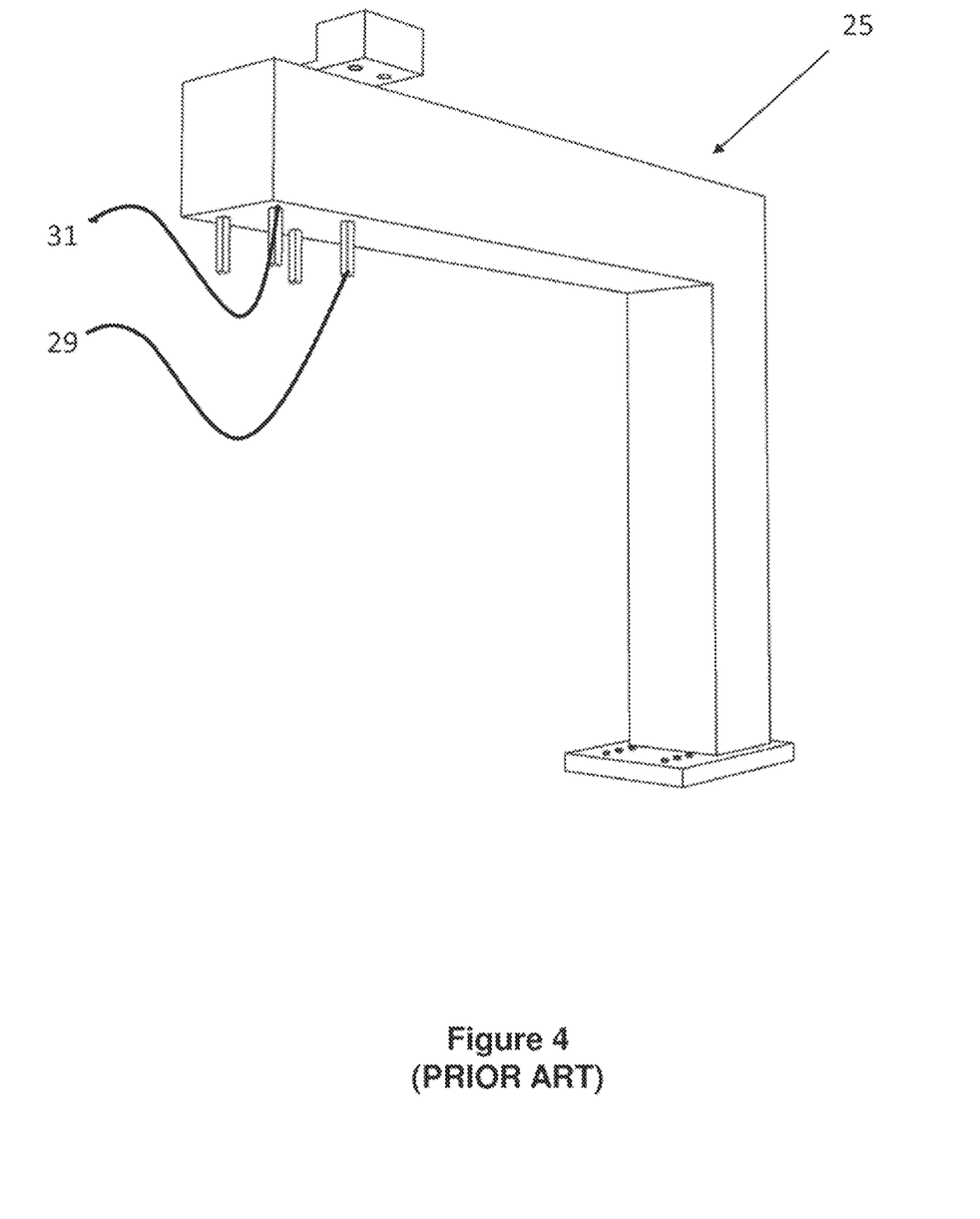
FIG. 4 is a schematic diagram of a known charging system for robotic load handling devices.
Figure 5:
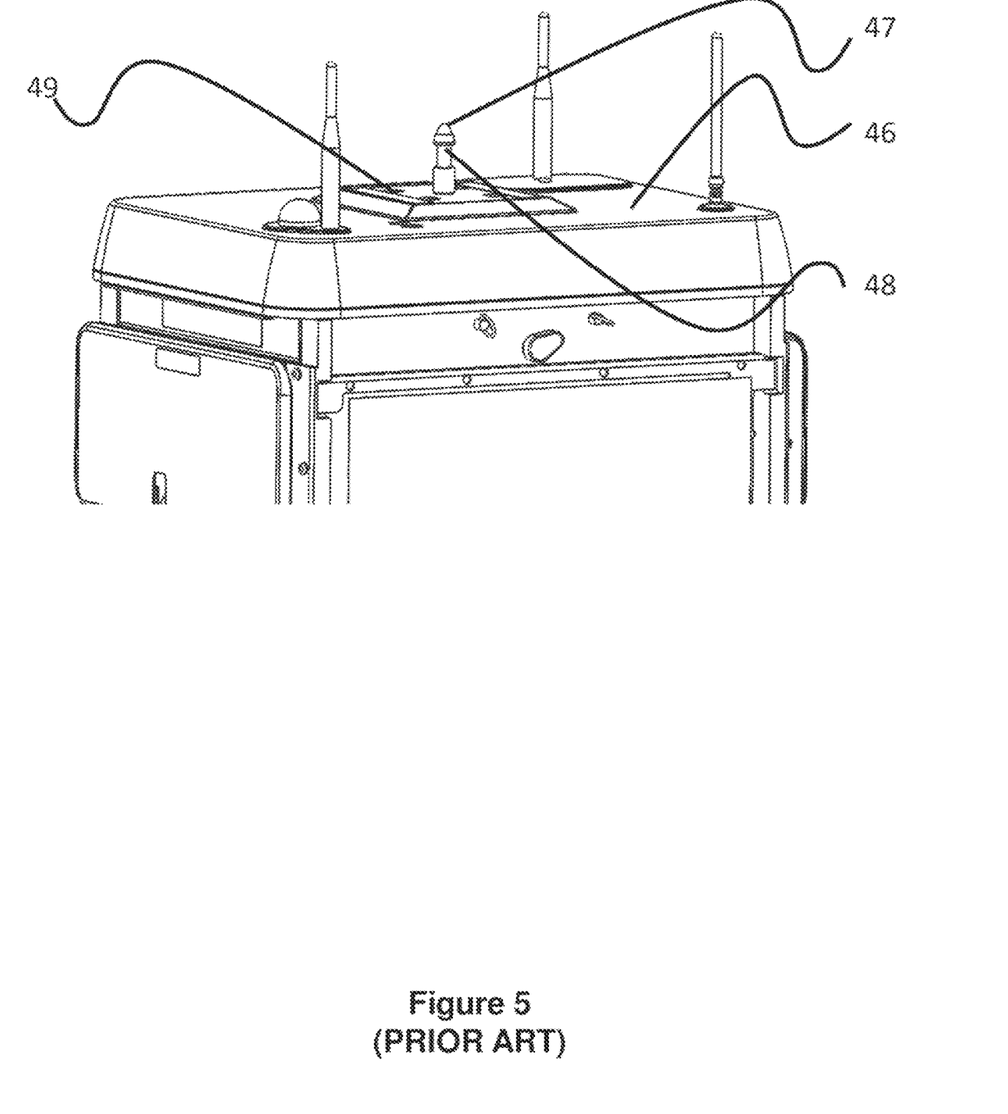
FIG. 5 is a schematic diagram of a top surface of a robotic load handling device.

Although not shown in FIGS. 1-3, the robotic load handling device 30 is powered during operation by a battery. The battery is recharged while the robotic load handling device 30 is operative on the grid framework structure by a charge station 25 shown in FIG. 4. The charge station 25 is fixed to a structure proximate to the grid framework structure and extends over a nominal grid cell at an edge of the grid structure. The charge station 25 comprises a charge head 31 comprising charge contacts 29 which are fixed in position relative to the charge station 25. A robotic load handling device 30 may be charged by being instructed to move to a grid cell above which the charge head 31 is located. As a robotic load handling device 30 moves into the grid cell, a contact is made between a charge contact pad 49 on a top surface 46 of the robotic load handling device 30, shown in FIG. 5, and the charge contacts 29 of the charge head 31. A charge is imparted to the robotic load handling device 30 from the charge contacts 29 through the charge contact pad 49 situated on the top surface 46 of the robotic load handling device 30. Additionally, some of the charge contacts 29 may be used for data transfer during charging. FIG. 5 shows a hoist element 47 used for manual movement of the robotic load handling device 30. The hoist element 47 comprises a cutaway below a bulbous head which gives rise to an underside 48. The hoist element 47 is so designed to permit the attachment of a hoist to lift the robotic load handling device 30 from a grid cell.

However, a number of problems exist with the charge station 25. In particular, due to the movement of the robotic load handling device 30 into the charge station 25, a clamping force exists between the charge contacts 29 and the robotic load handling device 30. However, the magnitude of this force can cause problems to arise over a period of time. For example, repeated entries of the robotic load handling device 30 into the grid cell above which the charge station 25 is located causes a fatiguing of the charge station 25 which will then require maintenance or replacement of the charge head 31 and supporting structure. Moreover, vibration of the grid framework structure 14 caused by movement of the robotic load handling devices 30 negatively affects the alignment between the charge contacts 29 of the charge station 25 and the robotic load handling device 30. Moreover, grid cell damage, wear and material creep cause alignment issues between the charge contacts 29 and the charge pad contacts 49 negatively affecting the ability of the robotic load handling device 30 to make contact with the charge contacts 29. Similarly, tolerances in both the manufacture of the grid framework structure 14 and charge station 25 and/or slight variation in installation alignment of the grid framework structure 14 with respect to the charge station 25 and/or thermal expansion of the grid framework structure 14 with respect to the charge station 25 can also cause alignment issues which negatively affect the ability of the robotic load handling device 30 to make contact with the charge contacts 29.

Moreover, the charge contacts 29 wear with time and therefore require periodic servicing or repair. However, the maintenance of the charge contacts 29 requires human intervention on the top of the grid framework structure 14 which can only be performed if the robotic load handling devices 30 on top of the grid framework structure 14 are in a "safe mode" rendering them inoperable. This leads to a loss of production of the whole system.

SUMMARY

In view of the problems, the present invention aims to provide a charge station which reduces the wear/damage experienced by the charge contacts 29 and provide a solution whereby easier servicing of the charge contacts 29 can be accomplished.

In general, the present invention introduces a charge station in which a charger head 36 is drawn towards the charge pad 49 on the top surface 46 of the robotic load handling device 30.

The present invention provides a charge unit for a robotic load handling device operative on top of a grid framework. The charge unit comprises a plurality of profiled sections arranged to interface with a hoist element of the robotic load handling device, and a power transfer means arranged to transfer power to the robotic load handling device.

The present invention also provides a system comprising a housing. The housing comprises a charge unit as previously described. The system further comprises a supporting structure fixedly attached to a grid framework, the supporting structure arranged to position the housing over the grid framework.

The present invention also provides a storage system comprising a first set of parallel rails or tracks extending in an X-direction, and a second set of parallel rails or tracks extending in a Y-direction transverse to the first set in a substantially horizontal plane to form a grid pattern comprising a plurality of grid spaces. A plurality of stacks of containers are located beneath the rails, and arranged such that each stack is located within a footprint of a single grid space. The storage system further comprises at least one transporting device, the at least one transporting device being arranged to selectively move laterally in the X and Y directions, above the stacks on the rails. The storage system further comprises a system as previously described.

The present invention also provides a method of charging a robotic load handling device using a charge unit, the robotic load handling device operative on top of a grid framework, the charge unit comprising a plurality of profiled sections and a power transfer means. The method comprises the steps of aligning the charge unit on a top surface of the robotic load handling device by way of interfacing between a hoist element of the robotic load handling device and the plurality of profiled sections and imparting power to the robotic load handling device by way of the power transfer means.

DETAILED DESCRIPTION

Figure 6:
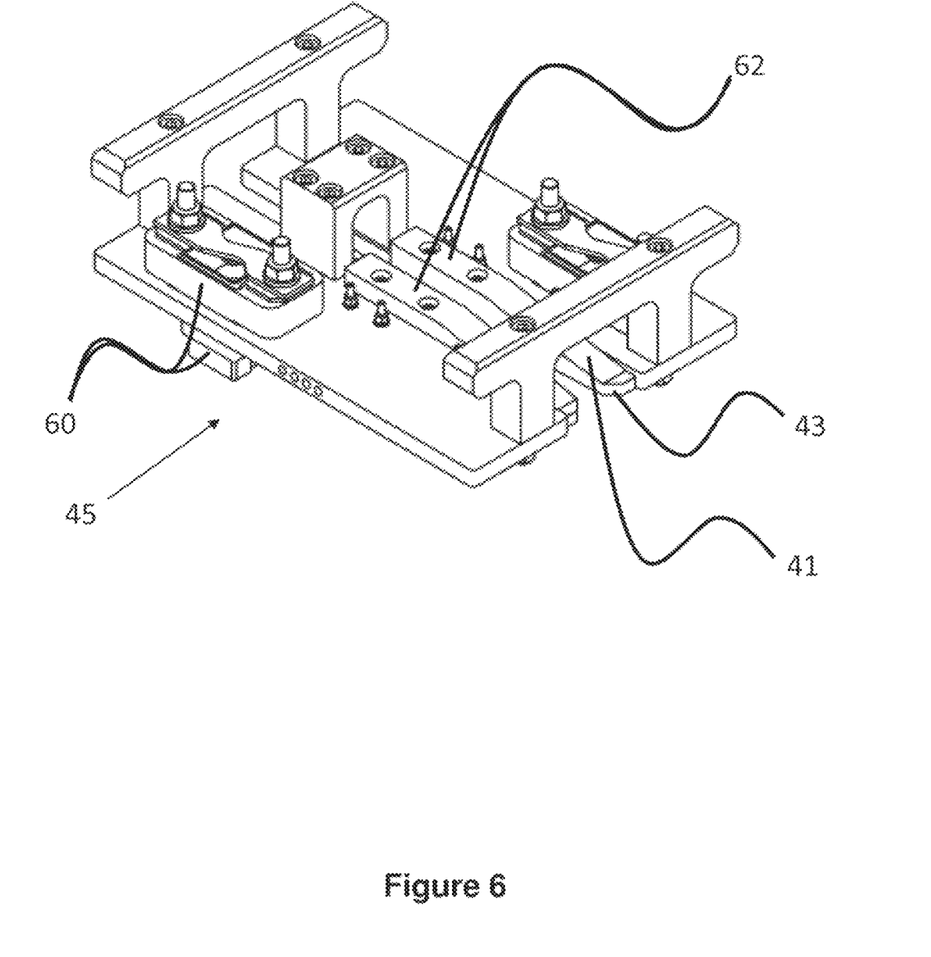
FIG. 6 is a schematic diagram from above of a charge unit showing a plurality of profiled sections.

FIG. 6 shows a cartridge 45 seen from above comprising a power transfer component 60 and a removable element 62 comprising a first profiled section 41 and a second profiled section 43. The cartridge 45 is arranged centrally above the grid cell in which a robotic load handling device 30 is to charge. As described previously, FIG. 5 shows the top surface 46 of the robotic load handling device 30. The top surface 46 of the robotic load handling device 30 comprises a hoist element 47 with an underside 48. Therefore, as a robotic load handling device 30 enters into a grid cell 56 below the cartridge 45, the first profiled section 41 of the cartridge 45 interacts with the hoist element 47 of the robotic load handling device 30. The interaction of the hoist element 47 and the robotic load handling device 30 causes a movement of the cartridge 45 to a desired position on top of the charge pad 49 on the top surface 46 of the robotic load handling device 30. One movement of the cartridge 45 is due to the interaction of the first profiled section 41 of the cartridge 45 and the underside 48 of the hoist element 47 on the top surface 46 of the robotic load handling device 30. As the robotic load handling device 30 moves into the grid cell 56 below the cartridge 45, contact between the first profiled section 41 of the cartridge 45 and the underside 48 of the hoist element 47 on the top surface 46 of the robotic load handling device 30 causes a movement of the cartridge 45 towards the robotic load handling device 30. Similarly, as the robotic load handling device 30 moves into the grid cell 56 below the cartridge 45, contact between the second profiled section 43 of the cartridge 45 and the hoist element 47 on the top surface 46 of the robotic load handling device 30 causes a horizontal movement of the cartridge 45 towards the robotic load handling device 30.

Therefore, the present invention is, advantageously, arranged for the hoist element 47 of the robotic load handling device 30 to determine the amount of clamping of the cartridge 45 with the top surface 46 of the robotic load handling device 30. In this way, the damage/wear to the cartridge 45 and/or the top surface 46 of the robotic load handling device 30 is minimised. In particular, instead of relying on a crude clamping force between charge contacts 29 and the top surface 46 of the robotic load handling device 30, the speed of entry of the robotic load handling device 30 into the cartridge 45 determines the intensity of the clamping force by relying on the interaction between the first profiled section 41 and the hoist element 47. Moreover, by varying the profile of the first profiled section 41 the clamping force acting on the robotic load handling device 30 may be customised as required by the specific application.

However, because there is an impact on the cartridge 45 from the underside 48 of the hoist element 47, it is to be expected that the first profiled section 41 and second profiled section 43 of the removable element 62 will wear during operation. This is preferable to the charge contacts 29 being the predominant wearable component of the charge station 25, as the removable element 62 does not necessarily have to be made from a highly conductive material, as is the case of the charge contacts 29. The removable element 62 of the cartridge 45 is replaceable quickly and at a low expense. Alternatively, the first and second profiled sections 41, 43 of the cartridge 45 may be made from a harder material to thereby limit wear. Moreover, the power transfer component 60 is a removable component within the cartridge 45. To facilitate the removal of the power transfer component 60 from the cartridge 45, the means of supplying power (not shown) to the power transfer component 60 includes a connector which allows disengaging and engaging during servicing in a simple manner. The means of supplying power can be any means capable of supplying power to the power transfer component 60.

Figure 7:
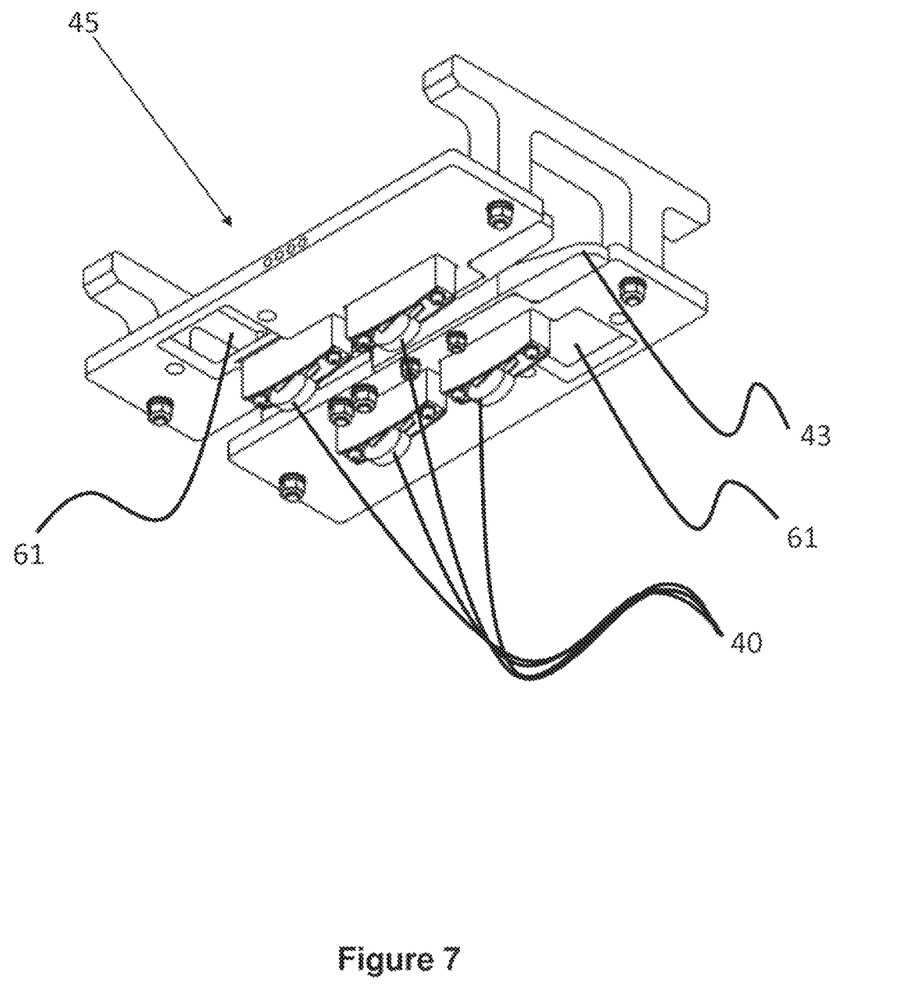
FIG. 7 is a schematic diagram from below of the charge unit showing a power transfer means.

FIG. 7 shows the cartridge 45 seen from below where the power transfer unit 60 is not in place. In use, the power transfer unit 60 occupies a cavity 61. As the robotic handling device 30 enters into the grid cell below the cartridge 45 and the cartridge 45 is drawn towards the charge pad 49 on the top surface 46 of the robotic load handling device 30, contact is made between the power transfer unit 60 and the charge pad 49. The power transfer unit 60 may be sprung so as to lessen the impact of the power transfer unit 60 making contact with the charge pad 49 on the top surface 46 of the robotic handling device 30.

A charge being imparted to the robotic load handling device 30 from the charge contacts 29 through the charge contact pad 49 situated on the top surface 46 of the robotic load handling device 30 is advantageous as it allows for charging of the robotic load handling device 30 along any edge of the grid framework structure 14, a feature not possible where a charge is imparted to charge contacts located on one side of a robotic load handling device 30.

FIG. 7 shows that the cartridge 45 comprises a plurality of charge contacts 40 on its underside. As the robotic handling device 30 enters into the grid cell below the cartridge 45 and the cartridge 45 is drawn towards the charge pad 49 on the top surface 46 of the robotic load handling device 30, contact is made between the charge contacts 40 and the charge pad 49. The charge contacts 40 may be sprung so as to lessen the impact of the charge contacts 40 making contact with the charge pad 49 on the top surface 46 of the robotic load handling device 30. The charge contacts 40 may be for the purpose of anti-arcing or data transfer during charging. Although in FIG. 7 four charge contacts 40 are shown, there could be any number of charge contacts 40, in any arrangement. Similarly, there may be any number of power transfer units 60 incorporated into the cartridge 45, in any arrangement. The power transfer units 60 are similar to the charge contacts 40 in their movement and are distinguished in that they supply power to the robotic load handling device 30 during charging.

In an alternative embodiment of the present invention, the power transfer means 45 may comprise an inductive power transfer means, which does not require physical contact between the power transfer means 45 and the robotic load handling device. Accordingly, the wear experienced by the cartridge 45 is reduced due to the removal of physical contact between the power transfer means 45 and the robotic load handling device. Similarly, other methods of contactless charging may be foreseen as an alternative to the power transfer means 45.

Figure 8:
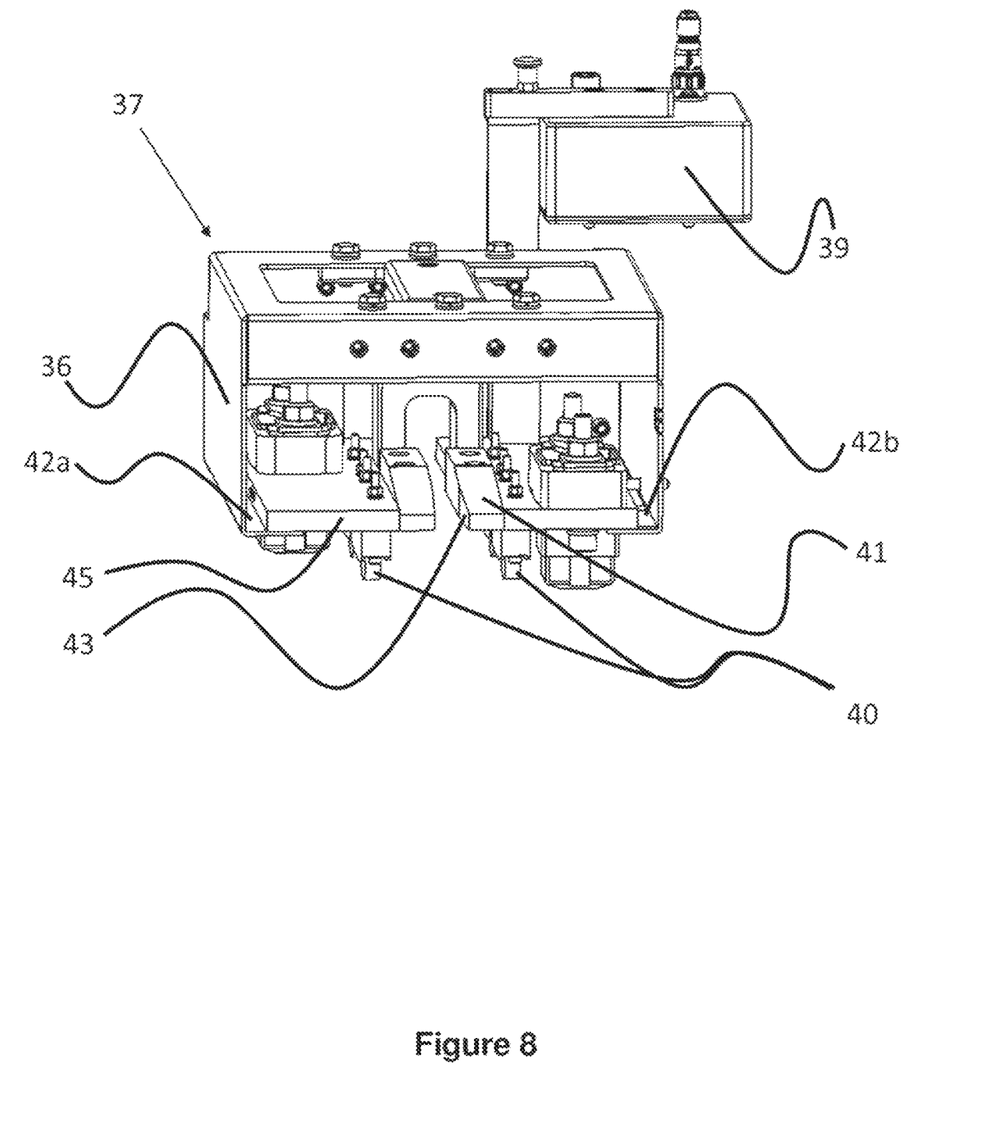
FIG. 8 is a schematic diagram of a housing with a charge unit contained therein.

FIG. 8 shows a cutaway view of a charge head 37, comprising a housing 36 comprising the cartridge 45 and voids 42a, 42b. Therefore, the cartridge 45 is compliant within the housing 36, in that the housing 36 supports the cartridge 45 so that the cartridge 45 is not moveable vertically, relative to the housing 36, however the cartridge 45 is movable within the housing 36 in a horizontal direction. Horizontal movement is forced, as described above, as a result of the underside 48 of the hoist element 47 of the robotic load handling device 30 making contact with the second profiled section 43 of the cartridge 45. Optionally, each of the voids 42a, 42b may comprise a spring mechanism (not shown) to centre the cartridge 45 within the housing 36 following the exit of the robotic load handling device 30 from the grid cell below the charge head 37.

Optionally, a communication device 39 may be mounted to the housing 36 or to the cartridge 45, and arranged to communicate with the robotic load handling device 30. For optimal data transfer the data communication device 39 needs to be aligned with a corresponding data communication device on the top surface 46 of the robotic load handling device 30. Advantageously, due to the ability of the cartridge 45 to accurately align with the robotic load handling device 30 (for the purposes of battery charging), then this alignment may be used to provide optimal alignment of the communication device 39 with the corresponding data communication device on the top surface 46 of the robotic load handling device 30.

Figure 9:
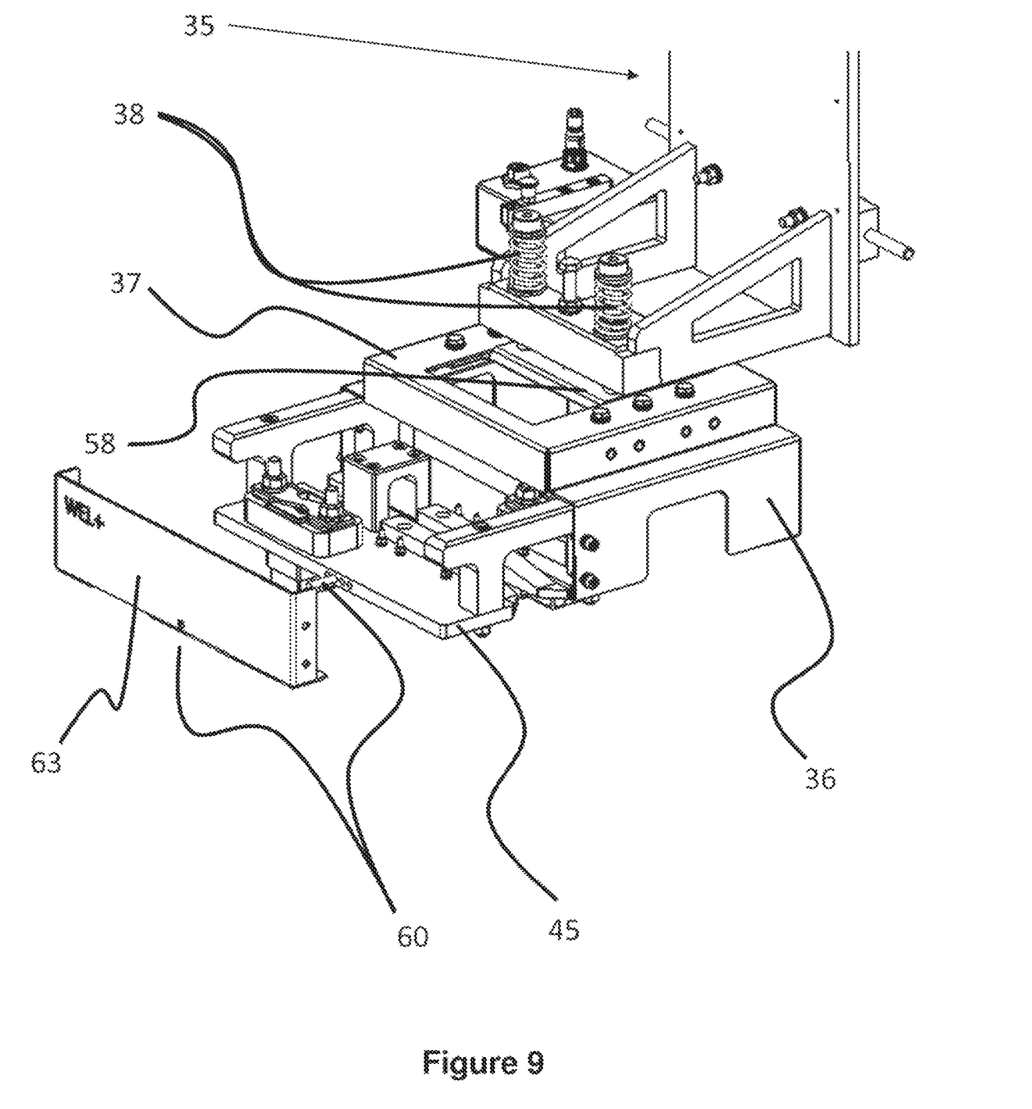
FIG. 9 is a schematic diagram of a charge unit, a housing and a supporting structure.

FIG. 9 shows the charge head 37 mounted to a carriage 35 by way of a spring mechanism 38 between the charge head 37 and the carriage 35. The spring mechanism 38 allows vertical movement of the charge head 37 relative to the carriage 35. Although shown as a spring mechanism 38, it is also envisaged that other embodiments could be used, such as pneumatics or gels, to a similar effect. As the robotic load handling device 30 moves into the grid cell 56 below the charge head 37, contact between the first profiled section 41 of the cartridge 45 and the underside 48 of the hoist element 47 on the top surface 46 of the robotic load handling device 30 causes a vertical movement of the charge head 37 relative to the carriage 35 towards the robotic load handling device 30. The spring mechanism 38 absorbs the impact of the vertical movement and returns the charge head 37 to a position close to the carriage 35 following charging. The effect of this is that succeeding robotic load handling devices 30 entering into the grid cell below the charger head 37 do not make initial contact with the charge contacts 40 of the cartridge 45 but instead make contact with the first profiled section 41 of the cartridge 45. Moreover, by varying the spring constant of the spring mechanism 38, the clamping force acting on the robotic load handling device 30 may be customised as required by the specific application.

FIG. 9 also shows an attachment 60 (in this example comprising a dowel and pin) to thereby ensure that the cartridge 45 is fitted in the housing 36 with the correct orientation. In this example a physical block (a dowel attached to the cartridge 45) prevents the fitting of an end plate component 63 to the housing 36 during assembly of the charge head 37 unless the cartridge 45 is correctly installed.

FIG. 9 also shows that the cartridge 45 can easily be removed from the housing 36 following the removal of the endplate 63. The design of the cartridge 45 being moveable horizontally within the housing 36 means that, following removal of the endplate 63, the cartridge 45 is easily removable from the housing, allowing easy servicing of the cartridge 45.

To facilitate the cartridge 45 being movable horizontally within the housing 36 the cartridge 45 may preferably be made out of low friction materials, for example a polymer. Alternatively, the housing 36 or the cartridge 45 may preferably comprise a rolling or sliding interface, for example a bearing, to facilitate horizontal movement of the cartridge 45 within the housing 36.

FIG. 9 also shows an area 58 of the housing 36 where the charge head 37 can be mounted to the carriage 35. The area 58 may encompass the entire top surface of the housing 36 to allow for variation in fixing position of the charge head 37 to the carriage 35.

In an alternative embodiment, the housing 36 may be mounted to a structure suspended from the ceiling of the warehouse. This brings benefits in being able to charge the robotic load handling devices 30 at any position on the grid framework structure 14.

Figure 10:
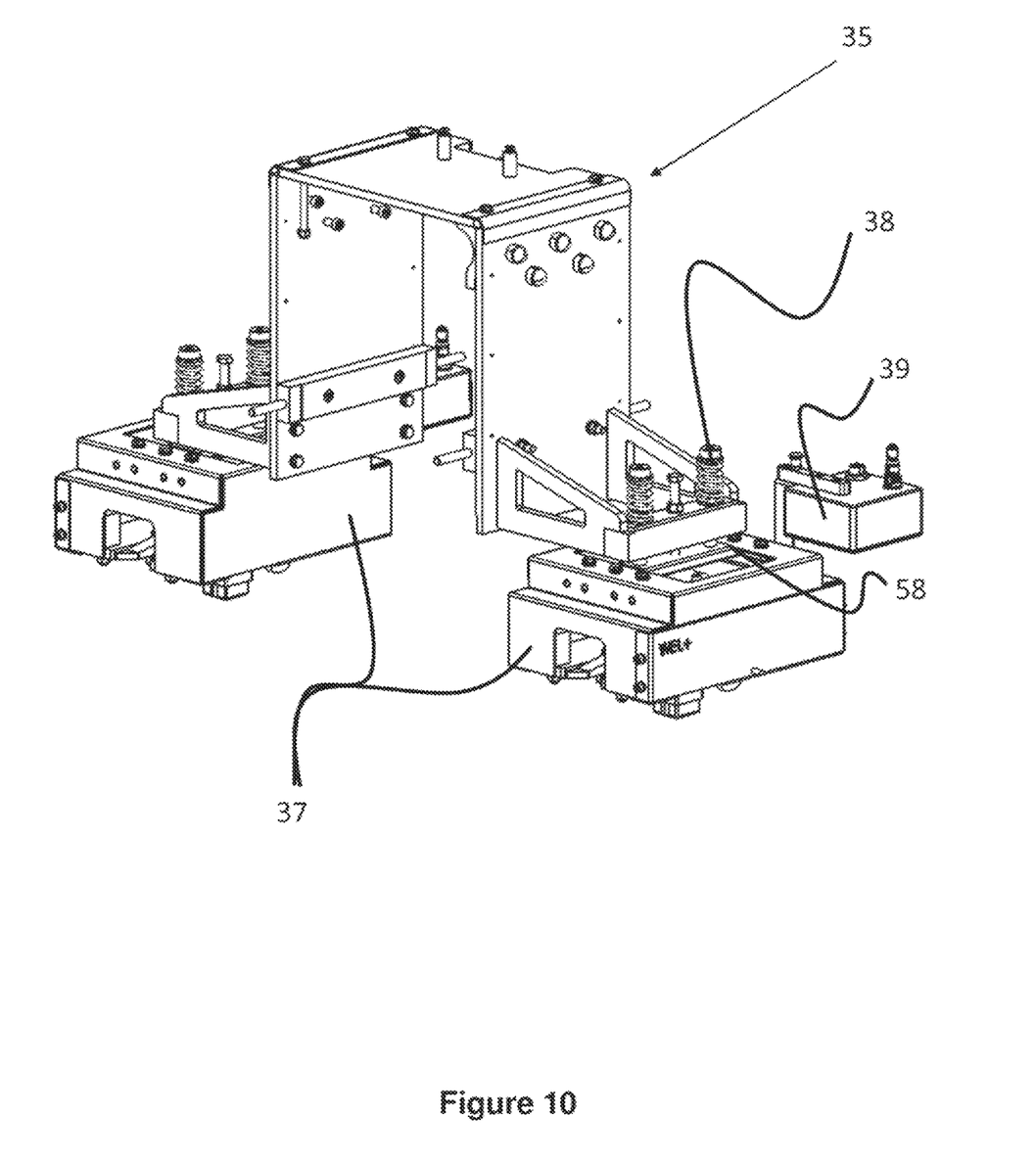
FIG. 10 is a schematic diagram of two housings mounted on a supporting structure.

FIG. 10 shows one example of mounting two charge heads 37 to the carriage 35. Each charge head 37 is separately movable relative to the carriage 35, therefore a plurality of charge heads 37 may be mounted to a single support structure thereby reducing the number of support structures necessary.

Figure 11:
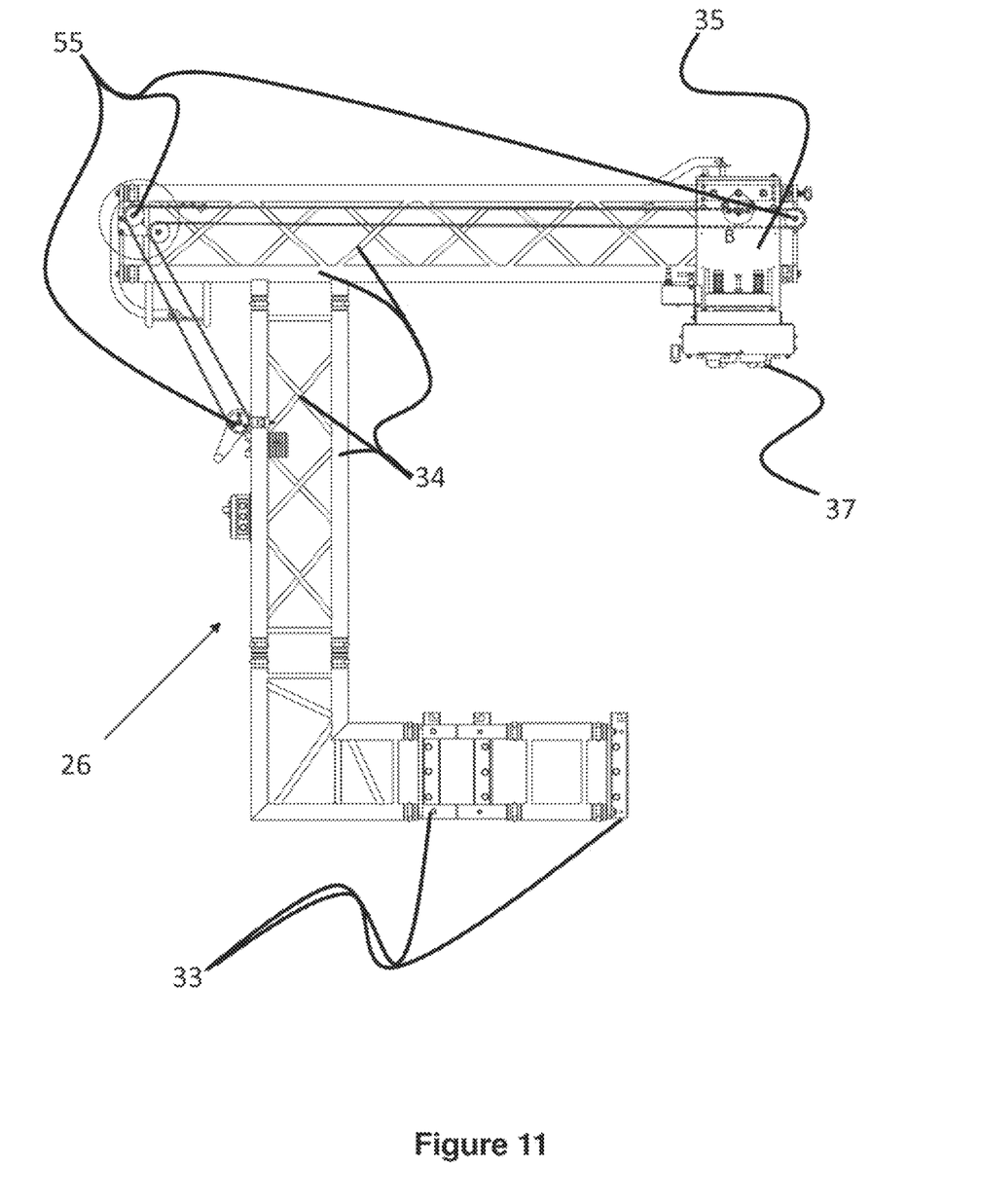
FIG. 11 is a schematic diagram showing a charge system including a clamp, a supporting structure and a housing.

FIG. 11 shows a charge station 26 comprising a main structure 34, a pulley system 55, a clamp 33, the carriage 35 and the charge head 37. The main structure 34 may contain a rail or guide (not shown) on which the carriage 35 is moveable. The pulley system 55 can manipulate the carriage 35 under manual or automated operation so as to move the carriage 35 along a section of the main structure 34 on a rail or guide to a position of safety away from the grid framework structure 14. Retracting the carriage 35 is an advantage because it allows for servicing of components attached to the carriage 35 from a position of safety away from the grid framework structure 14. The clamp 33 attaches the main structure 34 of the charge station 26 to any edge of the grid framework structure 14. The clamp 33 attaches to two vertical upright structures 16 which form the grid framework structure 14. By attaching the charge station 26 to the grid framework structure 14, and not merely proximate to the grid framework structure 14, then tolerances in the grid framework structure 14 due to manufacture/installation and/or thermal expansion which otherwise cause alignment issues can be solved because the clamp 33 effectively moves the charge station 26 with the grid framework structure 14.

The main structure 34 may be a mount for a carriage 35 and charging head 37. The main structure 34 could also be used as a mount for any other device which could be attached to the main structure 34. Devices which would benefit from being mounted to and moveable with the grid framework structure 14 could include a refrigeration unit, a robotic picking arm, a robotic load handling device 30 servicing unit and/or a mount for a drone device.

Figure 12:
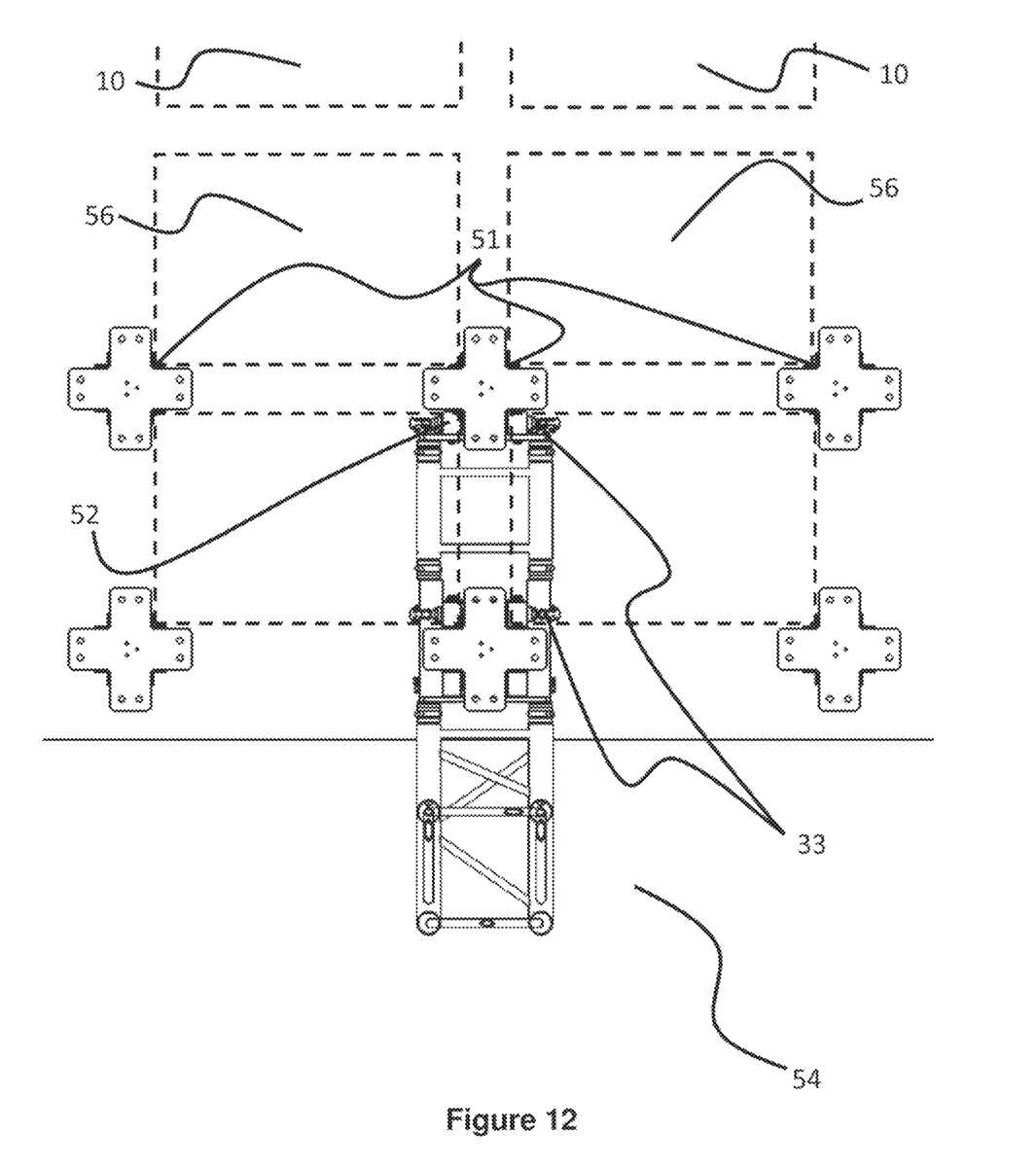
FIG. 12 is a schematic diagram showing a top-down view showing a clamp attached to the grid framework structure.

FIG. 12 shows a top-down view of the clamp 33, which may be a friction-fit clamp 52 which fits to the upright face 51 of the vertical member 16 of the grid framework structure 14. The clamp 33 in this case has two opposing plates which grip the upright face 51 of the vertical member 16 of the grid framework structure 14 on two sides by way of a friction fit. In operation, the main structure 34 of the charge station 26 extends to a position over a grid cell 56. In operation, the charge head 37 is in position above the grid cell 56. There is a platform 54 proximate to the grid framework structure 14 which allows human access to the rear of the charge station 26.

Figure 13:
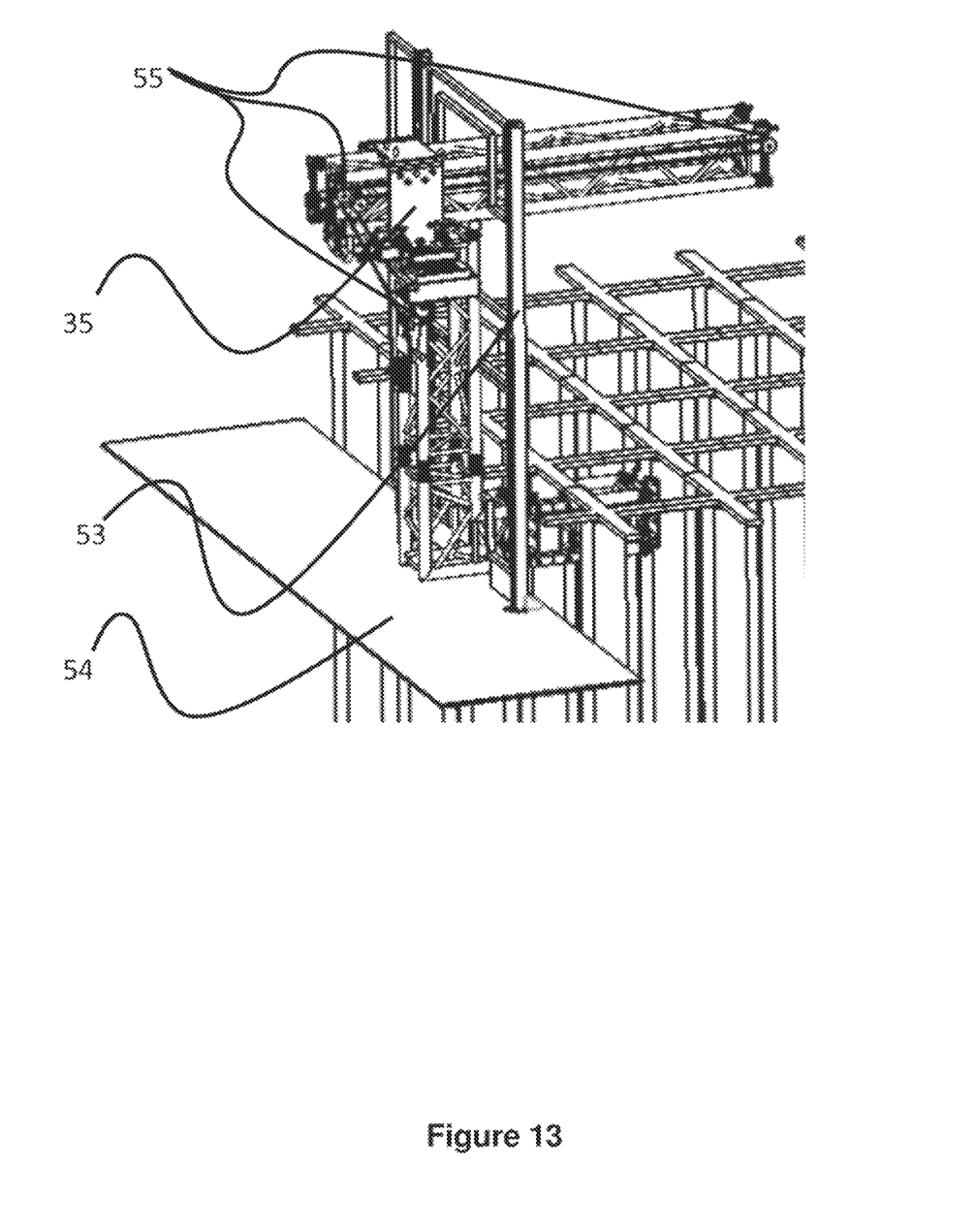
FIG. 13 is a schematic diagram showing a charge system attached to a grid framework structure.

FIG. 13 shows the charge station 26 attached to the grid framework structure 14, with the carriage 35 retracted to a safe position behind a safety barrier 53. To accommodate the carriage 35 being retracted, the means to supply power to the power transfer unit 60 is preferably flexible. In the retracted position, the charge head 37 and the replaceable section 62 of the cartridge 45, the charge contacts 40 and the power transfer unit 60 comprised therein are serviceable by a human standing on the structure 54 proximate to the grid framework structure 14. This solves the problem of the robotic load handling devices 30 having to be made inoperable on top of the grid framework structure 14, with the result that the system is still capable of production during the servicing of a charge head 37. Optionally, the main structure 34 may comprise a locking mechanism to secure the carriage 35 in its operable position at a defined point along the main structure 34. The locking mechanism may be operated manually by a human standing on the structure 54, but foreseeably this could be automated.

MODIFICATIONS AND VARIATIONS

Many modifications and variations can be made to the embodiments described above, without departing from the scope of the present invention.

Although the present description has described a robotic load handling device arranged to carry a container or the like, other types of robotic devices are envisaged to be compatible with the charge station described herein. For example, it is envisaged that robotic cleaning devices, robotic recovery devices or the like could be charged using the charge station described herein.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A charge unit for a robotic load handling device that is configured to be operative on top of a grid framework, the charge unit comprising:
   a power transfer means arranged for transferring power to the robotic load handling device; and
   a plurality of profiled sections configured and arranged to interact with a hoist element of the robotic load handling device to effect a vertical and horizontal alignment of the charge unit towards a contacting position at which a charge pad on a top surface of the robotic load handling device contacts the power transfer means.

2. The charge unit according to claim 1, wherein the power transfer means includes contacts arranged and configured to transfer data to/from the robotic load handling device.

3. The charge unit according to claim 1, wherein the power transfer means comprises:
   a first spring such that the power transfer means is moveable vertically relative to the plurality of profiled sections.

4. A method of charging a robotic load handling device using a system having a grid framework structure including a plurality of upright members that support a horizontal grid structure having a first set of parallel horizontal member arranged perpendicular to a second set of parallel horizontal members; and a charge station having i) a carriage; ii) a charge head, said charge head including a charge unit and is mounted to the carriage by way of a spring mechanism to allow vertical movement of the charge head relative to the carriage; iii) a main structure, said carriage and the charging head are mounted to the main structure and said main structure includes a clamp for attaching the main structure of the charge station to any edge of the grid framework structure; and iv) a pulley system for manipulating the carriage under manual or automated operation so as to move the carriage along a section of the main structure on a rail or guide, the charge unit including a power transfer means arranged for transferring power to the robotic load handling device; and a plurality of profiled sections configured and arranged to interface with a hoist element of the robotic load handling device to effect a vertical and horizontal alignment of the charge unit towards a contacting position at which a charge pad on a top surface of the robotic load handling device contacts the power transfer means, the robotic load handling device including a hoist element and is operative on top of a grid framework, the method comprising:
  entering a grid cell below the charge unit;
  aligning the charge unit on a top surface of the robotic load handling device by way of interfacing between the hoist element of the robotic load handling device and the plurality of profiled sections such that the charge unit is drawn towards a charge pad on the top surface of the robotic load handling device; and
  imparting power to the robotic load handling device by way of the power transfer means.

5. The method according to claim 4, comprising:
  returning the charge unit to a position closer to the carriage after imparting power to the robotic load handling device.

6. A charge station for charging a robotic load handling device operable on a grid framework structure, the charge station comprising:
  A) a charge unit, the charge unit comprising:
    i) a power transfer means arranged for transferring power to the robotic load handling device; and
    ii) a plurality of profiled sections configured and arranged to interact with a hoist element of the robotic load handling device to effect a vertical and horizontal alignment of the charge unit towards a contacting position at which a charge pad on a top surface of the robotic load handling device contacts the power transfer means;
  B) a carriage;
  C) a charge head, said charge head including the charge unit is mounted to the carriage by way of a spring mechanism to allow vertical movement of the charge head relative to the carriage;
  D) a main structure, said carriage and the charging head are mounted to the main structure and said main structure includes a clamp for attaching the main structure of the charge station to any edge of the grid framework structure; and
  E) a pulley system for manipulating the carriage under manual or automated operation so as to move the carriage along a section of the main structure on a rail or guide.

7. The charge station of claim 6, wherein the charge head comprises a housing including the charge unit and wherein the charge unit is moveable within the housing in a horizontal direction but is prevented from moving vertically, relative to the housing.

8. The charge station of claim 7, wherein the housing comprises a positioning means configured and arranged to allow the charge unit to move horizontally within the housing.

9. The charge station of claim 8, wherein the positioning means further comprises:
  a second spring configured and arranged such that the charge unit self-centers in the housing by moving horizontally relative to the housing following the exit of the robotic load handling device from the charge unit.

10. The charge station of claim 7, wherein the housing further comprises:
  a communication unit configured and arranged to communicate with a communication unit of the robotic load handling device.

11. A system comprising:
  A) a grid framework structure including a plurality of upright members that support a horizontal grid structure having a first set of parallel horizontal member arranged perpendicular to a second set of parallel horizontal members;
  B) a charge station for charging a robotic load handling device operable on a grid framework structure, the charge station comprising:
    i) a charge unit, the charge unit comprising:
      a) a power transfer means arranged for transferring power to the robotic load handling device; and
      b) a plurality of profiled sections configured and arranged to interact with a hoist element of the robotic load handling device to effect a vertical and horizontal alignment of the charge unit towards a contacting position at which a charge pad on a top surface of the robotic load handling device contacts the power transfer means;
    ii) a carriage;
    iii) a charge head, said charge head including the charge unit mounted to the carriage by way of a spring mechanism to allow vertical movement of the charge head relative to the carriage;
    iv) a main structure, said carriage and the charging head are mounted to the main structure and said main structure includes a clamp for attaching the main structure of the charge station to any edge of the grid framework structure; and
    v) a pulley system for manipulating the carriage under manual or automated operation so as to move the carriage along a section of the main structure on a rail or guide,
  wherein the main structure of the charge station is attached to the edge of the grid framework structure by a clamp.

12. The system of claim 11, wherein the clamp attaches to two upright members.

13. The system according to claim 11, comprising:
  a plurality of housings, wherein the plurality of housings are supported on a single supporting structure.

* * * * *